UNITED STATES PATENT OFFICE.

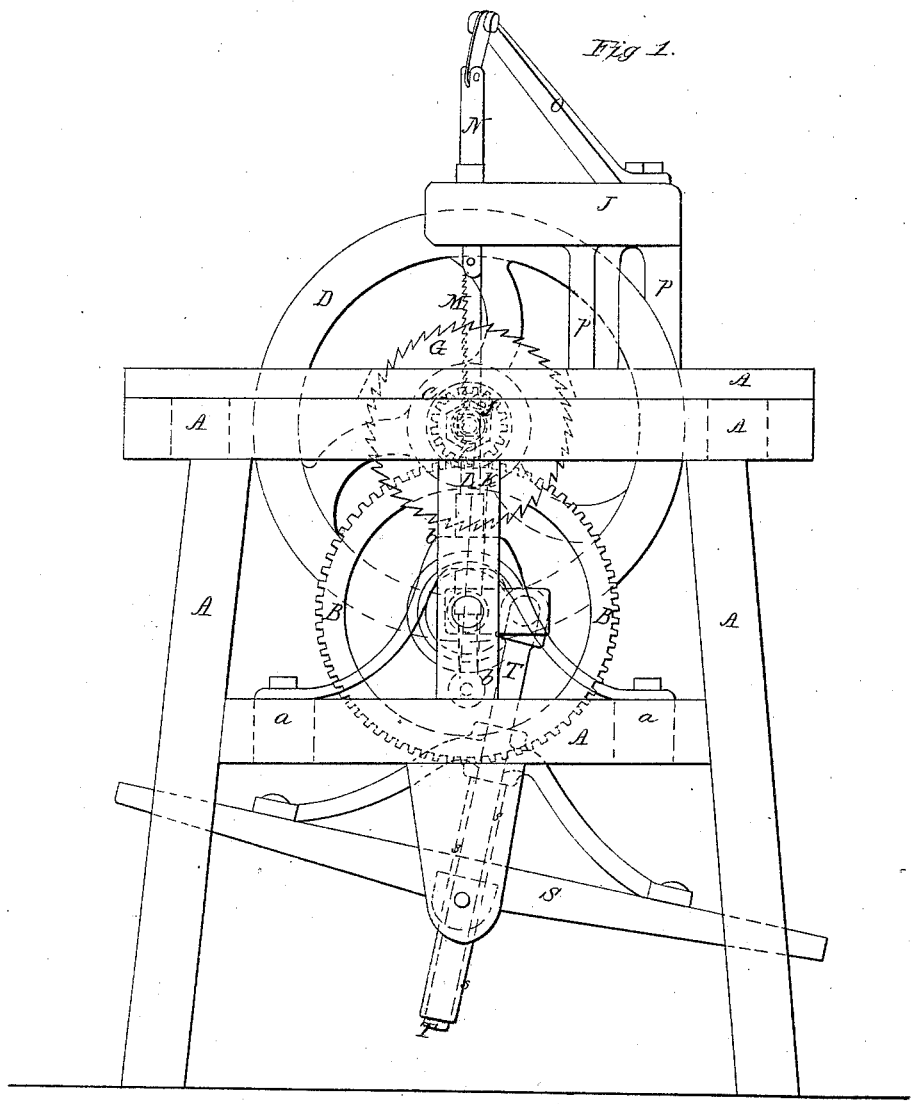

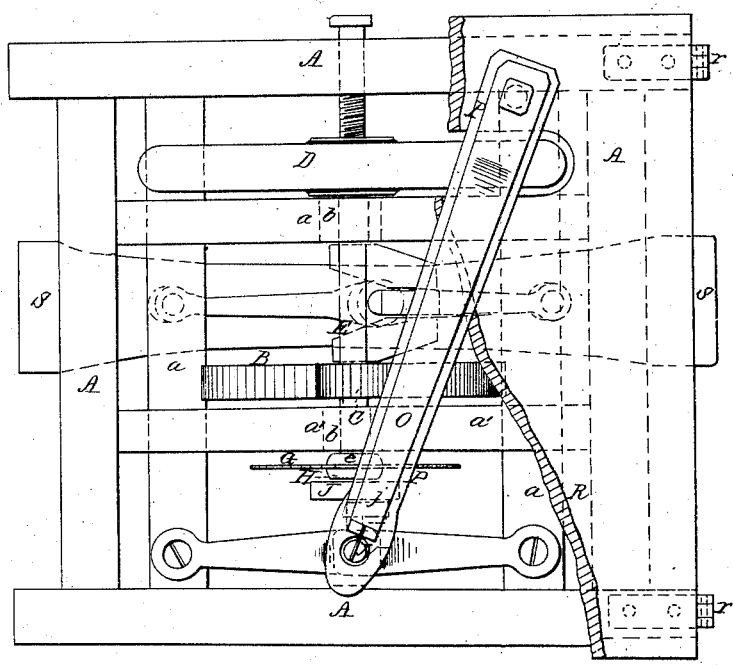

JOHN C. CLIME, OF CAMDEN, NEW JERSEY.

ARRANGEMENT OF MECHANISM IN SAWING-MACHINES.

Specification of Letters Patent No. 30,463, dated October 23, 1860.

*To all whom it may concern:*

Be it known that I, JOHN C. CLIME, of the city and county of Camden, State of New Jersey, have invented a new and Improved Combination Sawing-Machine to be Operated by Foot-Power; and I do hereby declare that the following is a full, clear, and exact description of the construction and operation of the same, reference being had to the annexed drawings, making a part of this specification, in which—

Figure 1 is a side view; Fig. 2 a top view of the machine, a portion of the leaf of the table being cut away to expose parts that otherwise would be concealed.

The machine is designed for use in places where steam power cannot be economically employed, all the parts being arranged with a view to the use of as little gearing as is consistent with the peculiar capacity in the machine of speedy adaptation to the circular or scroll saw, as occasion may require the use of one or the other. When the fly-wheel is not arranged on the same shaft as the pinion and circular saw, the latter rebounds and there is a consequent jar of the pinion and driving wheel, as often as the material presented to the saw comes in contact with the latter, at the first contact. This occasions roughness in the cut of the saw. But by arranging the fly-wheel, pinion, circular saw, and crank (J) hereinafter described, on the same shaft, the rebound and jar are prevented and the saw cuts smoothly through the material. This arrangement also enables me to simplify the gearing of the scroll saw.

In the drawings (A) represents the frame or table. It is about three feet two inches square at the base and about three feet one inch high, having horizontal braces (a) (a'), Figs. 1 and 2, and upright braces (b), Figs. 1 and 2, which together form bearings for the different parts of the machine.

(B) is the cogged driving wheel; (C) the pinion; (D) the fly wheel, which in a machine to be operated by one person weighs about sixty pounds and in one to be operated by two persons about a hundred pounds. The pinion and fly-wheel are on the same shaft (E), Fig. 2, which has its bearings in the cross braces (a) (a') and which being projected through the cross brace (a') is provided with a fixed mandrel head (e) and forms the mandrel of the circular saw (G). The washer (H), Fig. 2, comes directly against the circular saw (G) and is secured by the nut (J), Fig. 2, which is at the same time the crank that communicates through the pitman (K) and sliding rod (L), Fig. 1, the required reciprocating motion to the scroll saw (M), Fig. 1.

The scroll saw when in use, is fastened to sliding rods (L) (N), Fig. 1, by pins, which pass through perforations made for the purpose in the rods and saw; it is strained by the spring (O), which is connected by a link to the sliding rod (N).

(P) is a removable cross-head having two upright posts (p) (p'), Fig. 1. A screw-bolt inserted through perforations in the spring and upright post (p), is fastened by a nut to the leaf (R), Fig. 2, of the table. The cross-head, when the scroll saw is disconnected from the sliding rod (N) may be turned on this bolt as a hinge. The leaf (R) of the table is joined to the frame by hinges (r), Fig. 2.

The machine is put in motion by the treadle (S), Fig. 1, having the tubular guide (s), through which the rod (T) that is connected with and that turns the crank of the driving wheel, slides.

When it is desired to use the machine for circular sawing, the scroll saw (M) is disconnected from the spring (O) by removing the pin that fastens the saw to the sliding rod (N), and from the crank (J) by unscrewing the shoulder (j) of the crank (J), and the circular saw (G) being placed on its mandrel (E) is secured between the mandrel head (e) and washer (H) by the crank (J), the leaf of the table being turned out of the way. Vice versa, the machine is prepared for scroll sawing by removing the circular saw (G), turning back the leaf (R) of the table and connecting the saw (M) with the crank (J) and spring (O).

Both saws may remain during the operation of either, but the machine cannot then be worked to the same advantage.

What I claim as new and desire to secure by Letters Patent, is—

The arrangement of the fly-wheel, pinion, circular saw, crank (J) and scroll-saw in the manner and for the purpose substantially as herein set forth.

JOHN C. CLIME.

Witnesses:
J. E. SHAW,
JOHN A. BURTON.